(12) United States Patent
Huh et al.

(10) Patent No.: US 7,308,280 B2
(45) Date of Patent: Dec. 11, 2007

(54) METHOD AND APPARATUS FOR CONTROLLING TRANSMISSION OF REVERSE POWER CONTROL CHANNEL IN A MOBILE COMMUNICATION SYSTEM

(75) Inventors: Hoon Huh, Songnam-shi (KR); Hee-Won Kang, Songnam-shi (KR); Yu-Suk Yun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 533 days.

(21) Appl. No.: 10/273,252

(22) Filed: Oct. 18, 2002

(65) Prior Publication Data

US 2003/0083090 A1 May 1, 2003

(30) Foreign Application Priority Data

Oct. 29, 2001 (KR) .............................. 2001-66900

(51) Int. Cl.
H04B 7/00 (2006.01)
H04Q 7/20 (2006.01)

(52) U.S. Cl. ..................... 455/522; 455/453; 455/512; 455/513; 455/535; 455/442; 370/345; 370/235

(58) Field of Classification Search ............... 455/453, 455/512, 513, 525, 442, 522; 370/345, 235
See application file for complete search history.

(56) References Cited

U.S. PATENT DOCUMENTS 6,047,183 A * 4/2000 Kingdon et al. ............ 455/440
6,069,871 A * 5/2000 Sharma et al. ............. 370/209
6,324,401 B1 * 11/2001 De Hoz Garcia-Bellido et al. ......................... 455/442
6,678,257 B1 * 1/2004 Vijayan et al. ............ 370/320
2002/0097697 A1 * 7/2002 Bae et al. .................. 370/335
2002/0115464 A1 * 8/2002 Hwang et al. ............. 455/522
2003/0013448 A1 * 1/2003 Dillinger et al. ........... 455/437
2003/0050084 A1 * 3/2003 Damnjanovic et al. .... 455/522
2004/0198404 A1 * 10/2004 Attar et al. ................ 455/522
2004/0233867 A1 * 11/2004 Wheatley et al. .......... 370/328

FOREIGN PATENT DOCUMENTS

JP       001137302    *  9/2001

* cited by examiner

Primary Examiner—Matthew D. Anderson
Assistant Examiner—Sujatha Sharma
(74) Attorney, Agent, or Firm—Roylance, Abrams, Berdo, & Goodman, L.L.P.

(57) ABSTRACT

A method and apparatus for controlling transmission of an RPC channel during a handoff in a mobile communication system. Only one AN is selected among a plurality of ANs to transmit reverse power control information to an AT. For this purpose, a Forward Link Selection message received at an AN from an RNC can be used. Alternatively, a DRC cover received at an AN from an AT can be used. The DRC cover indicates at least one of ANs excluding an AN having the worst channel condition for the AT.

29 Claims, 6 Drawing Sheets

METHOD AND APPARATUS FOR CONTROLLING TRANSMISSION OF REVERSE POWER CONTROL CHANNEL IN A MOBILE COMMUNICATION SYSTEM

BACKGROUND OF THE INVENTION

1. Field of the Invention

The present invention relates generally to a mobile communication system, and in particular, to an apparatus and method for transmitting an RPC (Reverse Power Control) channel in a CDMA (Code Division Multiple Access) mobile communication system.

2. Description of the Related Art

Long signal paths and shadowing worsen signal attenuation, inter-system interference, and fading in a radio environment. Thus the carrier-to-interference ratio (C/I) of a signal varies greatly according to channel condition. Standardized mobile communication systems adopt link adaptive techniques of controlling a data rate according to channel condition or C/I to increase channel throughput. The data rate is determined by a code rate and a modulation scheme. When the C/I is higher, the data rate is increased by using a higher code rate and a higher-order modulation. When the C/I is lower, the data rate is decreased by using a lower code rate and a lower-order modulation, thereby increasing channel reliability. A receiver estimates channel condition on the basis of a C/I, determines a data rate according to the estimated channel condition, and feeds back information about the data rate to a transmitter. Then the transmitter assigns the requested data rate to the receiver.

The Third Generation Partnership Project 2 (3GPP2) has established 1× EV-DO (Evolution-Data Only) and HDR (High Data Rate) standards for the purpose of supporting high-speed data service based on cdma200 1× standards. According to the standards, a transmitter is known as an AN (Access Network) and a receiver is known as an AT (Access Terminal) if it is forward link. On the 1× EV-DO physical layer adopting a link adaptive technique, 12 data rates are available according to three modulation schemes including QPSK (Quadrature Phase Shift Keying), 8PSK (8-ary Phase Shift Keying), and 16QAM (16-ary Quadrature Amplitude Modulation), two code rates (i.e., ⅕ and ⅓), and packet length.

An AT determines a data rate at which it can receive a forward traffic channel by measuring the C/I of a forward pilot channel and feeds back data rate information to an AN so that the AN can select a forward data rate based on the feed-back information. The data rate information is DRC (Data Rate Control) information. The DRC information is represented by a 4-bit DRC symbol transmitted on a DRC channel. Aside from the DRC information, the AT transmits 3-bit information indicating a sector that will be serviced among eight effective sectors on the DRC channel. The 3-bit sector information is defined as a DRC cover indicative of the index of an orthogonal code for covering such as a Walsh code.

FIG. 1 is a block diagram of channel structure in an AN of a conventional mobile communication system supporting high-speed data transmission. The channel structure is comprised of a traffic and control channel 101 to 108, a preamble 111 and 112, a MAC (Media Access Control) channel 121 to 123 and 131 to 134, and a pilot channel 141.

In the traffic and control channel, an encoder 101 encodes forward traffic/control channel information. A scrambler 102 scrambles the code symbols received from the encoder 101 with a predetermined scrambling code and a modulator 103 modulates the scrambled symbols by one of QPSK, 8PSK and 16QAM according to a data rate. A puncturing and repetition unit 104 punctures and repeats the modulation symbols received from the modulator 103 in a predetermined rule to match the data rate. A symbol demultiplexer (DEMUX) 105 demultiplexes the output of the puncturing and repetition unit 104. The outputs of the symbol DEMUX 105 are spread with orthogonal codes such as Walsh codes. A channel gain processor 107 multiplies each spread channel signal by a predetermined gain (e.g., ¼) and a chip level summer 108 sums the outputs of the channel gain processor 107 on a chip level.

In the preamble, a spreader 111 spreads a preamble signal with a Walsh code $W_i^{32}$ assigned according to a MAC index and a preamble repeater 112 repeats the spread signal a predetermined number of times according to the data rate.

A MAC channel is divided into an RA (Reverse Activity) channel and an RPC channel. Each channel is spread with a length 64 Walsh code. An RA bit repeater 121 repeats a 1-bit RAB (Reverse Activity Bit) according to a repetition factor set in RABLength. The RAB provides information about reverse link interference load and is broadcast to all ATs within the sector. An RA channel gain processor 122 multiplies the output of the RA bit repeater 121 by an RA channel gain and a spreader 123 spreads the output of the RA gain processor 122 with a predetermined Walsh code $W_4^{64}$. An RPC channel gain processor 131 multiplies RPC bits by a channel gain G(i). The RPC bits indicate reverse power control information for an AT with MACIndex i. The AN measures the C/I of the reverse link from the AT with MACIndex i. If the C/I is lower than a threshold, the RPC bits are set to '0' (UP) and if the C/I is higher than the threshold, they are set to '1' (DOWN). A spreader 132 spreads the output of the RPC channel gain processor 131 with a predetermined Walsh code $W_i^{64}$. A chip level summer 133 sums the outputs of the spreaders 123 and 132 at a chip level. A repeater 134 repeats the sum according to a predetermined repetition factor (e.g., 4). The transmission power of the RA channel and the RPC channel is maintained to be the same as that of the traffic, control, and pilot channels.

In the pilot channel, a spreader 141 spreads a pilot signal with all 0s on an In-phase channel with a predetermined Walsh code, Walsh 0.

A time-division multiplexer (MUX) 151 time-division multiplexes the outputs of the traffic and control channel, the preamble, the MAC channel, and the pilot channel according to a predetermined rule. A complex spreader 152 complex-spreads the outputs of the time-division MUX 151 with a predetermined PN (Pseudo Noise) code. A baseband filter 153 baseband-filters the PN-spread signal. The resulting signal is modulated with a corresponding carrier and transmitted to an AT through an antenna. Here, the transmission power is maintained to be reference transmission power, which can be set usually to the highest transmission power level of the transmitter.

FIGS. 2A and 2B illustrate the structures of slots in which the multiplexed forward traffic/control channel, MAC channel, and pilot channel output from the time-division MUX 151. FIG. 2A illustrates an active slot in which a traffic/control channel is delivered. In the active slot, each of two 96-chip pilot bursts is located at the center of each half slot. A 64-chip symbol of the MAC channel containing the RA channel and the RPC channel occurs four times in the slot, before and after the two pilot bursts. The remaining 1600 chips of the slot are occupied by the traffic/control channel.

FIG. 2B illustrates an idle slot free of the traffic/control channel. In the idle slot, only the pilot channel and the MAC channel are delivered. The AN transmits the time-division multiplexed traffic/control, MAC, and pilot channels with its highest transmission power on the forward link.

The MAC channel includes one RA channel and up to 59 RPC channels that are code-division multiplexed using 64 Walsh codes. Each of the channels is transmitted with its channel gain. A MAC index is assigned to the RA channel and each RPC channel. Each channel is spread with a 64 Walsh code corresponding to its assigned MAC index. For example, Walsh code 4 is assigned to the RA channel and different Walsh codes between Walsh code 5 to Walsh code 63 are assigned to each RPC channel. Since the RA channel is broadcast to all ATs within a sector, its channel gain is determined such that the reception energy of RA channels accumulated in as many slots as RABLength with respect to an AT at a cell boundary satisfies a reference RF error performance. On the other hand, each RPC channel is destined for a specific AT within the sector and up to 59 RPC channels exist. Because of limited power available to all the RPC channels, a channel gain sufficient to satisfy a reference RPC error performance cannot be assigned to each AT within the sector. As the number of ATs increases or an AT moves farther from an AN, channel gain requirements are increased. If the sum of RPC channel gains required to ensure sufficient RPC performance for all ATs is higher than the total power assigned to all of the RPC channels, a required channel gain cannot be assigned to each RPC channel or an RPC channel cannot be assigned to some ATs. As a result, the power control performance of each AT is seriously deteriorated. As the number of ATs increases, as more ATs are located at a cell boundary, and as the reception channel condition of ATs are bad, an RPC channel power assigned to each AT becomes less.

Some of ATs within the sector may be in a soft handoff situation and thus are assigned RPC channels from at least two sectors.

If received RPC bits are identical, the AT detects the RPC bit by diversity-combining the RPC channels received from the sectors. On the other hand, if the RPC bits are different, the AT detects them and increases its transmission power only when both RPC bits are '0' (UP). That is, an RPC channel delivers information for controlling the transmission power of an AT.

As described above, one AT occupies RPC channels from at least two sectors to achieve the diversity gain of the RPC channels at a soft handoff. However, power that could be assigned to an RPC channel for another AT is consumed for the benefit of the diversity gain, which causes a potential RPC channel power shortage and decreases the power control performance of the AT. What is worse, since the AT at soft-handoff is near a cell boundary and experiences degraded channel condition, it requires a higher channel gain to satisfy corresponding RPC channel error performance. If there are many concurrent ATs at soft-handoff, the RPC channel power shortage becomes more severe. Although the number of ATs at soft-handoff varies with sector size, AT distribution within the sector, and channel condition, a soft-handoff AT consumes much more RPC channel power than an AT in a normal operating situation.

Thus it can be concluded that since at soft handoff, an AT requires relatively high RPC channel power from at least two sectors, leading to a potential RPC channel power shortage, degrading the overall reverse link power control performance and simultaneously reducing the number of available RPC channels.

SUMMARY OF THE INVENTION

It is, therefore, an object of the present invention to provide a method and apparatus for controlling transmission of an RPC channel that is used to control the transmission power of an AT at handoff in a mobile communication system.

It is another object of the present invention to provide a method and apparatus for alleviating a power shortage of RPC channels that are used to control the transmission power of ATs at handoff in a mobile communication system.

It is a further object of the present invention to provide a method and apparatus for preventing the decrease of reverse power control performance at handoff in a mobile communication system.

It is still another object of the present invention to provide a method and apparatus for increasing the number of RPC channels that are available simultaneously at handoff in a mobile communication system.

To achieve the above and other objects, there are provided a method and apparatus for controlling transmission of an RPC channel in a mobile communication system. According to one aspect of the present invention, at least one AN in an active set, excluding an AN having the worst channel condition, is selected for an AT. Only the selected AN transmits reverse power control information to the AT.

According to another aspect of the present invention, an AN receives a message for selecting at least one of ANs excluding an AN having the worst channel condition for an AT from an RNC. The selected AN determines whether to transmit reverse power control information to the AT according to the received RNC message and begins transmitting the reverse power control information accordingly.

BRIEF DESCRIPTION OF THE DRAWINGS

The above and other objects, features and advantages of the present invention will become more apparent from the following detailed description when taken in conjunction with the accompanying drawings.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 3:
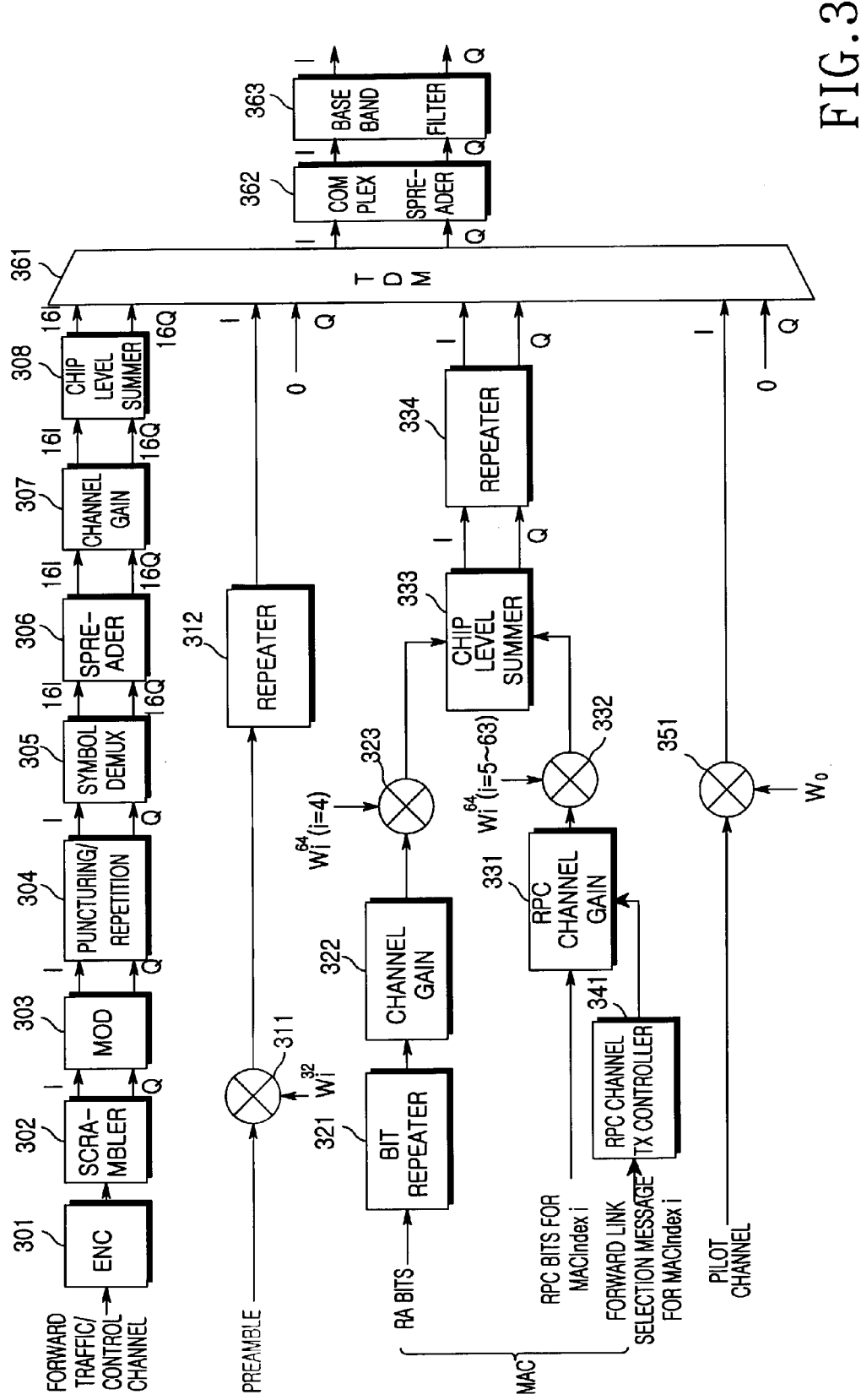
FIG. 3 is a block diagram of a channel structure for controlling RPC channel transmission in an AN according to an exemplary embodiment of the present invention.

FIG. 3 is a block diagram of forward channel structure for controlling RPC channel transmission in an AN according to an embodiment of the present invention. In the embodiment of the present invention, the transmitter is provided with an RPC channel transmission controller 341 that determines whether to transmit an RPC channel by a Forward Link Selection message received from an RNC (Radio Network Controller) (not shown). The embodiment of the present invention will be described mainly in the context of RPC channel transmission, with the same components as illustrated in FIG. 1 not described again.

The RNC selects an AN having the best forward channel condition for an AT according to the statistics of DRC covers received from ANs in its active set and transmits information about the selection to each AN by a Forward Link Selection message. At handoff, at least two ANs are in an active set. In a normal situation, one AN is in the active set. The selected AN transmits a traffic channel to the AT.

Referring to FIG. 3, the AN receives a Forward Link Selection message from the RNC with respect to all ATs with MACindex i at its receiver (not shown). The RPC transmit controller 341 determines whether to transmit an RPC channel to each AT by the Forward Link Selection message, sets the channel gain of each AT to 0 or a predetermined value, and feeds the channel gain to an RPC channel gain processor 331. The RPC channel gain processor 331 multiplies an RPC bit by a corresponding RPC channel gain. A spreader 332 spreads the output of the RPC channel gain processor 331 with a Walsh code $W_i^{64}$. The RPC channel signal output from the spreader 332 is code-division-multiplexed with other MAC channels in a chip level summer 333 and time-division-multiplexed with a pilot channel and a forward traffic/control channel in a time-division MUX 361. Thus, one sector (AN) with the best channel condition, as selected by the RNC, transmits an RPC channel to a corresponding AT at handoff.

Figure 4:
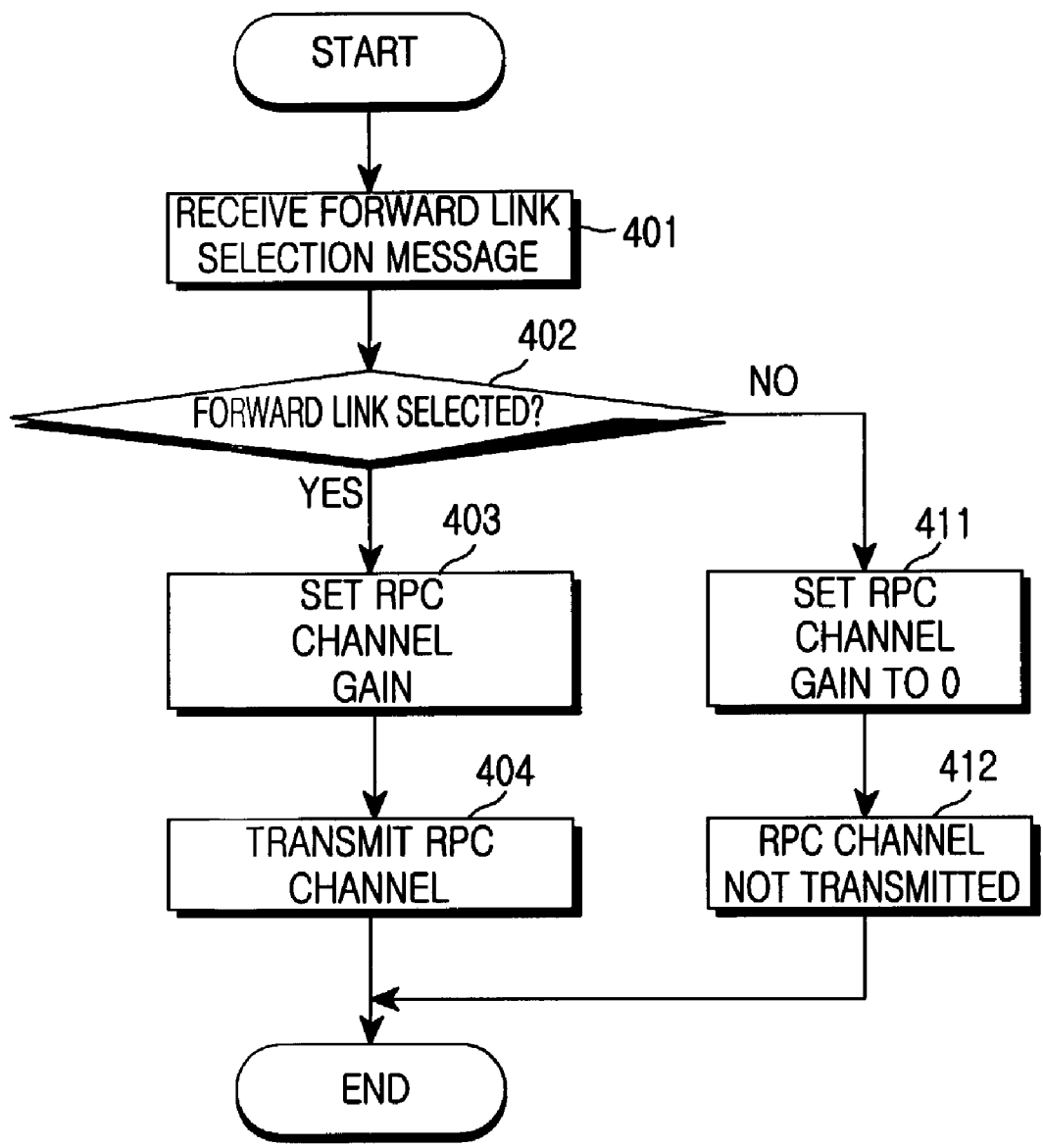
FIG. 4 is a flowchart illustrating a procedure for controlling RPC channel transmission according to the exemplary embodiment of the present invention in FIG. 3.

FIG. 4 is a flowchart illustrating a procedure for controlling RPC channel transmission in the AN illustrated in FIG. 3 according to an embodiment of the present invention.

Referring to FIG. 4, the RPC transmit controller 341 receives a Forward Link Selection message for MACIndex i in step 401 and determines whether the forward link of the AN has been selected with respect to each MACIndex in step 402. If the forward link of the AN has been selected, the RPC transmit controller 341 sets an RPC channel gain to a predetermined value and provides the RPC channel gain to the RPC channel gain processor 331 in step 403. Then the RPC channel gain processor 331 multiplies an RPC bit by the channel gain and transmits an RPC channel signal for MACIndex I in step 404. On the other hand, if the forward link of the AN has not been selected, the RPC transmit controller 341 sets the RPC channel gain to 0 and provides the RPC channel gain to the RPC channel gain processor 331 in step 411. Then the RPC channel gain processor 331 multiplies the RPC bit by the channel gain 0, thereby not transmitting an RPC channel for MACIndex i in step 412.

This embodiment of the present invention can be applied partially. That is the RPC channel transmission is controlled by the Forward Link Selection message only if the sum of power assigned to each RPC channel is higher than the total power available to the overall RPC channels.

Figure 1:
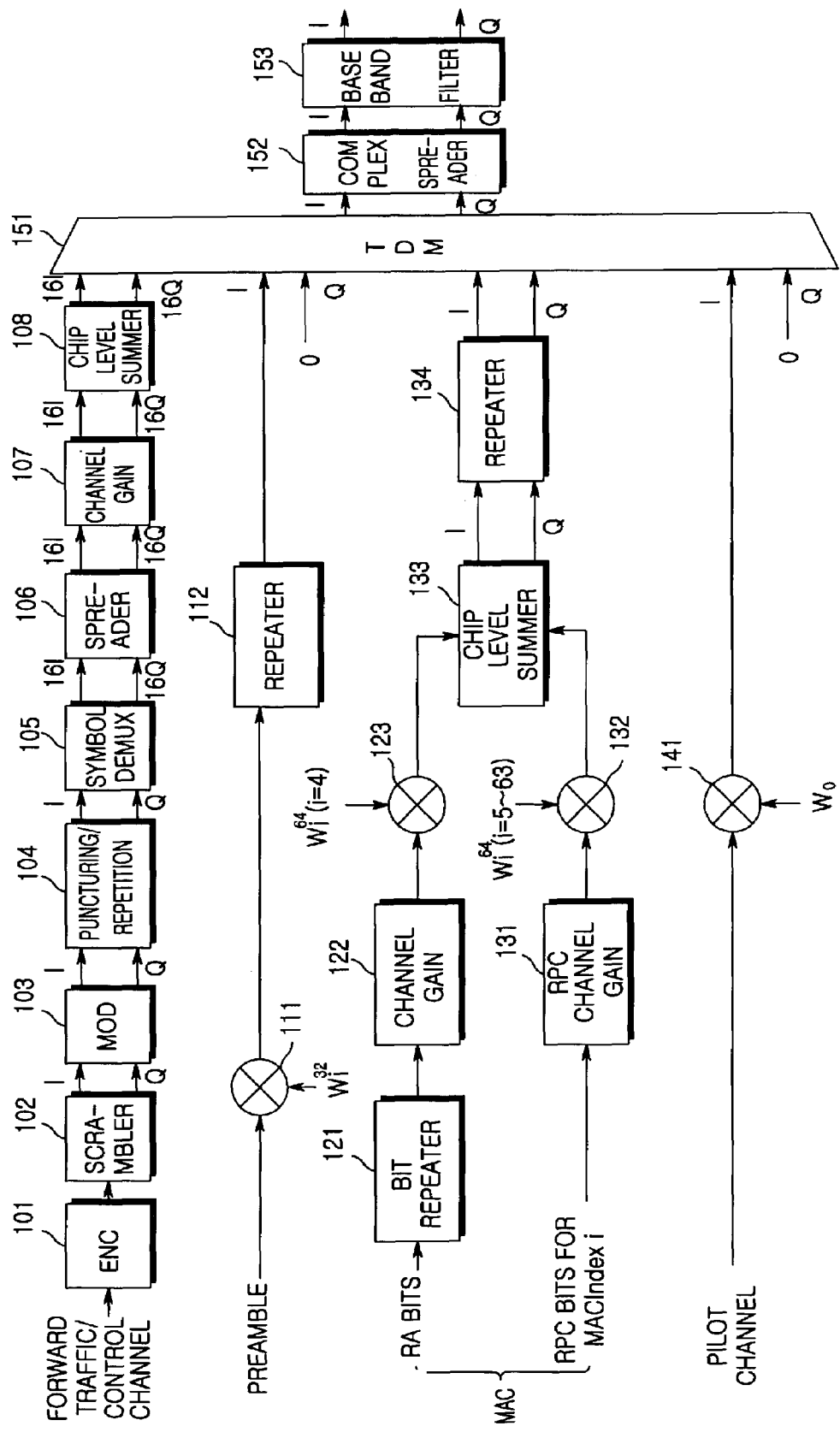
FIG. 1 is a block diagram of a conventional channel structure for an AN in a mobile communication system.
Figure 2A:
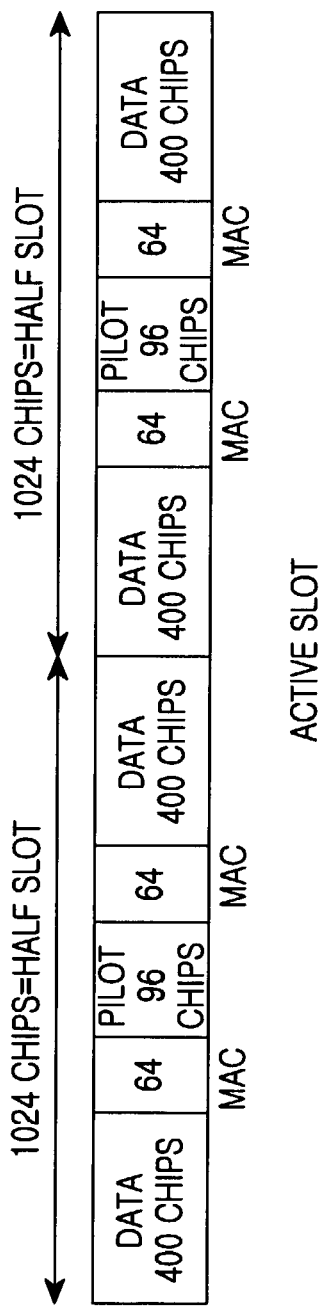
FIG. 2A illustrates the structure of an active slot in which the channel structure illustrated in FIG. 1 transmits a traffic/control channel.
Figure 2B:
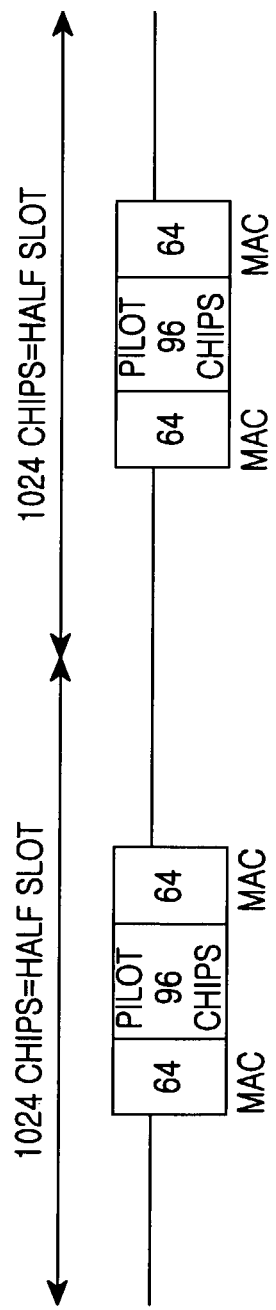
FIG. 2B illustrates the structure of an idle slot free of the traffic/control channel.
Figure 5:
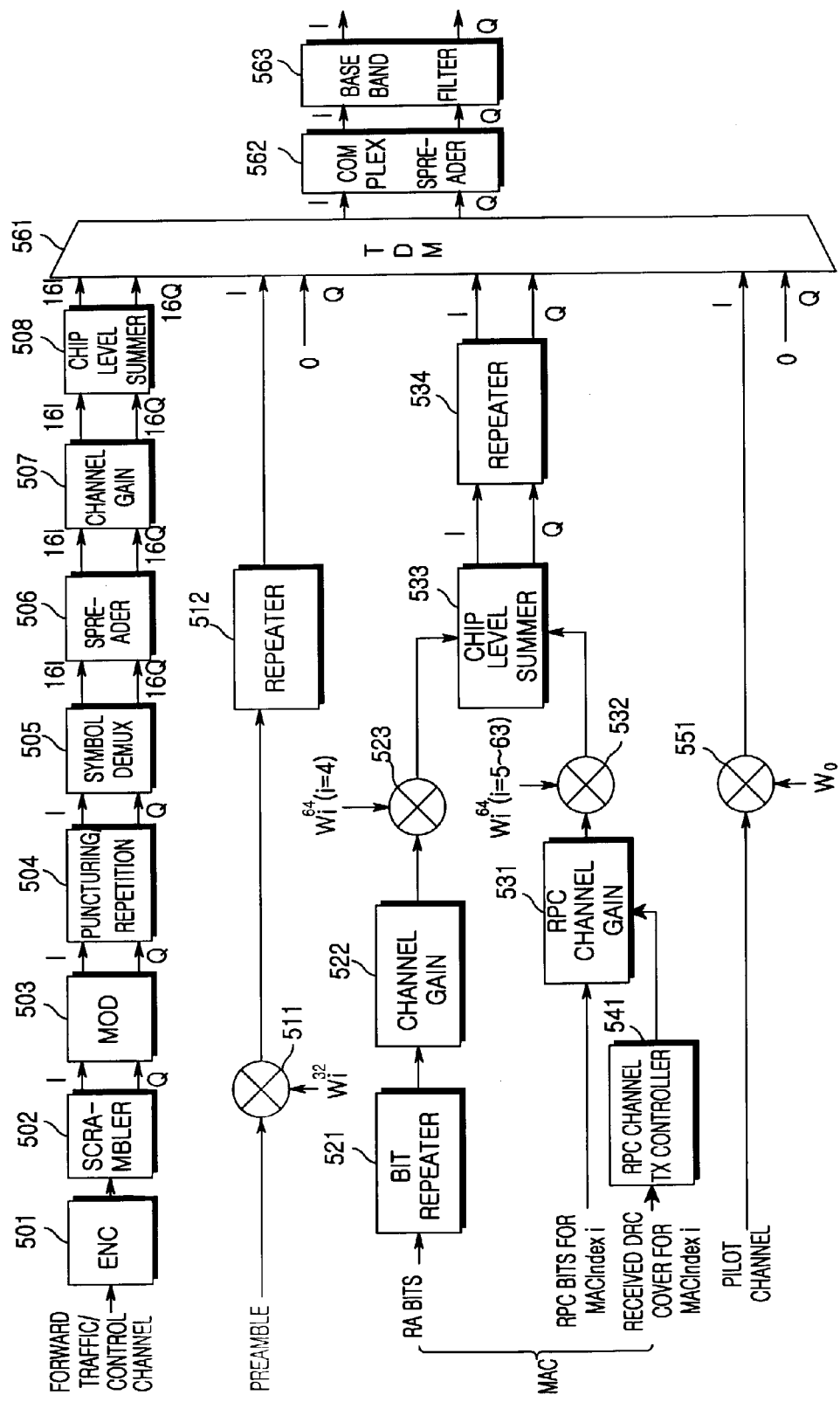
FIG. 5 is a block diagram of a channel structure for controlling RPC channel transmission in an AN according to another exemplary embodiment of the present invention.

FIG. 5 is a block diagram of forward channel structure for controlling RPC channel transmission in an AN according to another embodiment of the present invention. In the second embodiment of the present invention, the transmitter is provided with an RPC channel transmission controller 541 that determines whether to transmit an RPC channel by a DRC cover from an AT. Again, the same components as illustrated in FIG. 1 are not described.

Referring to FIG. 5, the AN receives DRC covers from all ATs with MACindex i at its receiver (not shown). A DRC cover indicates an AN having the best channel condition for a specific AT. The RPC transmit controller 541 determines whether to transmit an RPC channel to each AT by checking the DRC covers, sets the channel gain of each AT to 0 or a predetermined value, and feeds the channel gain to an RPC channel gain processor 531. If the DRC cover of an AT indicates the AN, the channel gain of the AT is set to a predetermined value, otherwise, it is set to 0. The RPC channel gain processor 531 multiplies an RPC bit by a corresponding RPC channel gain. A spreader 532 spreads the output of the RPC channel gain processor 531 with a Walsh code $W_i^{64}$. The RPC channel signal output from the spreader 532 is code-division-multiplexed with other MAC channels in a chip level summer 533 and time-division-multiplexed with a pilot channel and a forward traffic/control channel in a time-division MUX 561. Thus, only one sector having the highest C/I of its forward pilot channel selected by the AT transmits an RPC channel to the AT at handoff.

Figure 6:
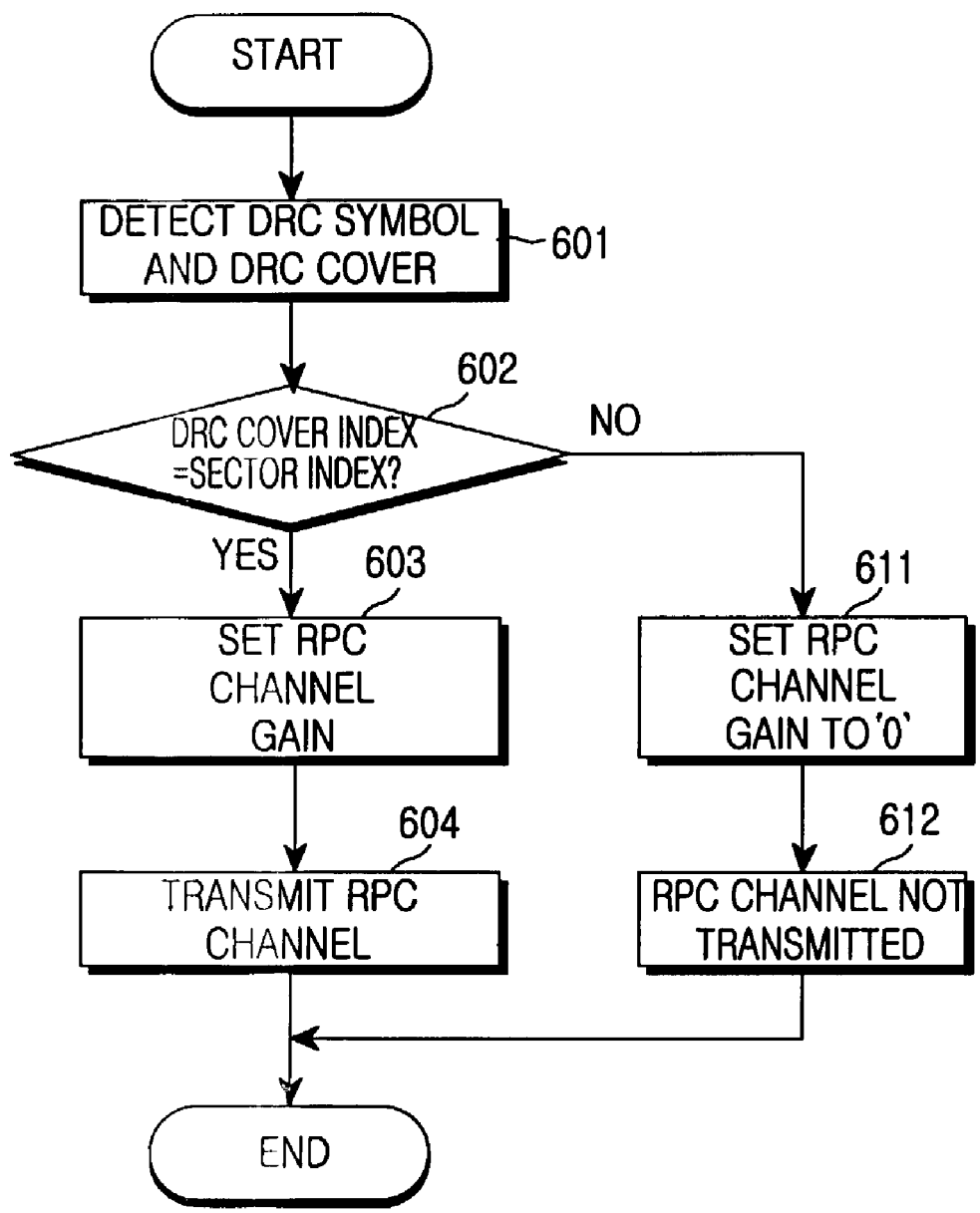
FIG. 6 is a flowchart illustrating a procedure for controlling RPC channel transmission according to the second exemplary embodiment of the present invention in FIG. 5.

FIG. 6 is a flowchart illustrating a procedure for controlling RPC channel transmission in the AN illustrated in FIG. 5 according to the second embodiment of the present invention.

Referring to FIG. 6, the RPC transmit controller 541 receives a DRC cover for MACIndex i in step 601 and determines whether the index of the DRC cover is identical to the index of the AN in step 602. If they are identical, the RPC transmit controller 541 sets an RPC channel gain to a predetermined value and provides the RPC channel gain to the RPC channel gain processor 531 in step 603. Then the RPC channel gain processor 531 multiplies an RPC bit by the channel gain and transmits an RPC channel signal for MACIndex I in step 604. On the other hand, if the indexes are different, the RPC transmit controller 541 sets the RPC channel gain to 0 and provides the RPC channel gain to the RPC channel gain processor 531 in step 611. Then the RPC channel gain processor 531 multiplies the RPC bit by the channel gain 0, thereby not transmitting an RPC channel for MACIndex i in step 612.

The second embodiment of the present invention can also be applied partially. That is, the RPC channel transmission is controlled using a DRC cover only if the sum of power assigned to each RPC channel is higher than the total power assigned to the overall RPC channels.

In accordance with the present invention, a control is provided using a Forward Link Selection message or a DRC cover for only one sector having the best forward channel condition to transmit an RPC channel to an AT at soft handoff. Therefore, power could be assigned to another AT is increased and an RPC channel power shortage is alleviated, thereby improving reverse power control performance and simultaneously increasing the number of RPC channels available.

While the invention has been shown and described with reference to certain preferred embodiments thereof, they are merely exemplary applications. For example, while an AN having the best channel condition is selected and only the selected AN transmits RPC information to an AT for controlling reverse transmission power in the embodiments of the present invention, it can be further contemplated that at least one of ANs excluding an AN at the worst channel condition is selected and only the selected AN transmits RPC information to the AT to alleviate an RPC channel power shortage. Therefore, it will be understood by those skilled in the art that various changes in form and details may be made therein without departing from the spirit and scope of the invention as defined by the appended claims.

What is claimed is:

1. A method of controlling transmission of reverse power control information in a mobile communication system having an AT (Access Terminal), a plurality of ANs (Access Networks) in an active set communicable with the AT at soft handoff, and an RNC (Radio Network Controller) connected to the plurality of ANs, comprising the steps of:
   selecting any of the ANs in the active set excluding an AN having the worst channel condition for the AT for designating at least one AN in the active set as the AN from which reverse power control (RPC) information is to be transmitted to the AT; and
   transmitting reverse power control (RPC) information from only the selected AN to the AT.

2. The method of claim 1, wherein the AN selecting step comprises the step of:
   transmitting a message to the selected AN for selecting the selected AN.

3. The method of claim 2, wherein the AN is selected by the RNC.

4. The method of claim 2, wherein the message is a Forward Link Selection Message.

5. The method of claim 2, wherein the selected AN has the best channel condition for the AT among the ANs.

6. A method of controlling transmission of reverse power control information in a mobile communication system having an AT (Access Terminal), a plurality of ANs (Access Networks) in an active set communicable with the AT at soft handoff, and an RNC (Radio Network Controller) connected to the plurality of ANs, comprising the steps of:
   selecting any of the ANs in the active set excluding an AN having the worst channel condition for the AT; and
   transmitting reverse power control (RPC) information from only the selected AN to the AL;
   wherein the AN selecting step comprises the step of:
     transmitting a message to the selected AN for selecting the selected AN;
     the selected AN having the best channel condition for the AT among the ANs; and
   wherein the best channel condition is based on statistics of a plurality of DRC (Data Rate Control) covers from the AT, the DRC covers corresponding to sector information indicative of an index of a code used for covering.

7. The method of claim 5, further comprising a step of receiving information indicating an AN having the highest signal strength of a pilot channel measured at the AT.

8. The method of claim 7, wherein the AT measures the signal strengths of pilot channels received from the ANs on a slot basis.

9. A method of controlling transmission of reverse power control information in an AN (Access Network) of a mobile communication system having an AT (Access Terminal), a plurality of ANs in an active set communicable with the AT during soft handoff, and an RNC (Radio Network Controller) connected to the plurality of ANs, comprising steps of:
   receiving a message from the RNC for selecting any of the ANs in the active set excluding an AN having the worst channel condition for the AT from the RNC for designating at least one AN in the active set as the AN from which reverse power control (RPC) information is to be transmitted to the AT;
   determining whether to transmit reverse power control information to the AT according to the received message; and
   transmitting the reverse power control (RPC) information to the AT if transmission of the reverse power control information is determined.

10. The method of claim 9, wherein the reverse power control information is transmitted with a predetermined gain to the AT.

11. The method of claim 9, wherein the selected AN has best channel condition for the AT among the ANs.

12. A method of controlling transmission of reverse power control information in an AN (Access Network) of a mobile communication system having an AT (Access Terminal), a plurality of ANs in an active set communicable with the AT during soft handoff, and an RNC (Radio Network Controller) connected to the plurality of ANs, comprising steps of:
   receiving a message from the RNC for selecting any of the ANs in the active set excluding an AN having the worst channel condition for the AT from the RNC;
   determining whether to transmit reverse power control information to the AT according to the received message; and
   transmitting the reverse power control (RPC) information to the AT if transmission of the reverse power control information is determined;
   wherein the selected AN has best channel condition for the AT among the ANs; and
   wherein the best channel condition is based on statistics of a plurality of DRC (Data Rate Control) covers from the AT, the DRC covers corresponding to sector information indicative of an index of a code used for covering.

13. The method of claim 12, wherein the received message indicates an AN having the highest signal strength of a pilot channel measured at the AT.

14. The method of claim 13, wherein the AT measures the signal strengths of pilot channels received from the ANs on a slot basis.

15. A method of controlling transmission of reverse power control information in an AN (Access Network) of a mobile communication system having an AT (Access Terminal), a plurality of ANs in an active set communicable with the AT during soft handoff and an RNC (Radio Network Controller) connected to the plurality of ANs, comprising steps of:
   receiving information indicating any of the ANs in the active set excluding an AN having worst channel condition from the AT for designating at least one AN in the active set as the AN from which reverse power control (RPC) information is to be transmitted to the AT;
   determining whether to transmit reverse power control information to the AT according to the information received; and
   transmitting the reverse power control information to the AT if transmission of the reverse power control information is determined.

16. The method of claim 15, wherein the reverse power control information is transmitted with a predetermined gain to the AT.

17. The method of claim 15, wherein the selected AN has best channel condition for the AT among the ANs.

18. The method of claim 17, wherein the received information indicates an AN having the highest signal strength of a pilot channel measured at the AT.

19. The method of claim 18, wherein the AT measures the signal strengths of pilot channels received from the ANs on a slot basis.

20. An apparatus for controlling transmission of reverse power control information in an AN (Access Network) of a mobile communication system having an AT (Access Terminal), a plurality of ANs in an active set communicable with the AT during soft handoff, and an RNC (Radio Network Controller) connected to the plurality of ANs, comprising:

a receiver for receiving a message for selecting any of the ANs in the active set excluding an AN having the worst channel condition for the AT from the RNC for designating at least one AN in the active set as the AN from which reverse power control (RPC) information is to be transmitted to the AT;

a controller for determining whether to transmit reverse power control information to the AT according to the received message; and a transmitter for transmitting the reverse power control information to the AT if transmission of the reverse power control information is determined.

21. The apparatus of claim 20, wherein the transmitter includes:

a gain processor for processing the reverse power control information with a predetermined gain; and a spreader for spreading the output of the gain processor.

22. The apparatus of claim 20, wherein the selected AN has the best channel condition for the AT among the ANs.

23. The apparatus of claim 22, wherein the received message indicates an AN having the highest signal strength of a pilot channel measured at the AT.

24. The apparatus of claim 22, wherein the AT measures the signal strengths of pilot channels received from the ANs on a slot basis.

25. An apparatus for controlling transmission of reverse power control information in an AN (Access Network) of a mobile communication system having an AT (Access Terminal), a plurality of ANs in an active set communicable with the AT during soft handoff, and an RNC (Radio Network Controller) connected to the plurality of ANs, comprising:

a receiver for receiving information indicating any of the ANs in the active set excluding an AN having the worst channel condition from the AT for designating at least one AN in the active set as the AN from which reverse power control (RPC) information is to be transmitted to the AT;

a controller for determining whether to transmit reverse power control information to the AT according to the received information; and a transmitter for transmitting the reverse power control information to the AT if transmission of the reverse power control information is determined.

26. The apparatus of claim 25, wherein the transmitter includes: a gain processor for processing the reverse power control information with a predetermined gain; and a spreader for spreading the output of the gain processor.

27. The apparatus of claim 25, wherein the selected AN has the best channel condition for the AT among the ANs.

28. The apparatus of claim 27, wherein the received information indicates an AN having the highest signal strength of a pilot channel measured at the AT.

29. The apparatus of claim 27, wherein the AT measures the signal strengths of pilot channels received from the ANs on a slot basis.

* * * * *